April 4, 1961

J. B. WAGNER ET AL 2,977,768

ELECTRICALLY CONTROLLED GOVERNING MECHANISMS
FOR ELASTIC FLUID TURBINES

Filed May 15, 1959

INVENTORS
James B. Wagner
Kenneth O. Straney
BY
Prangley, David, Clayton, Miller & Vogel
Attys.

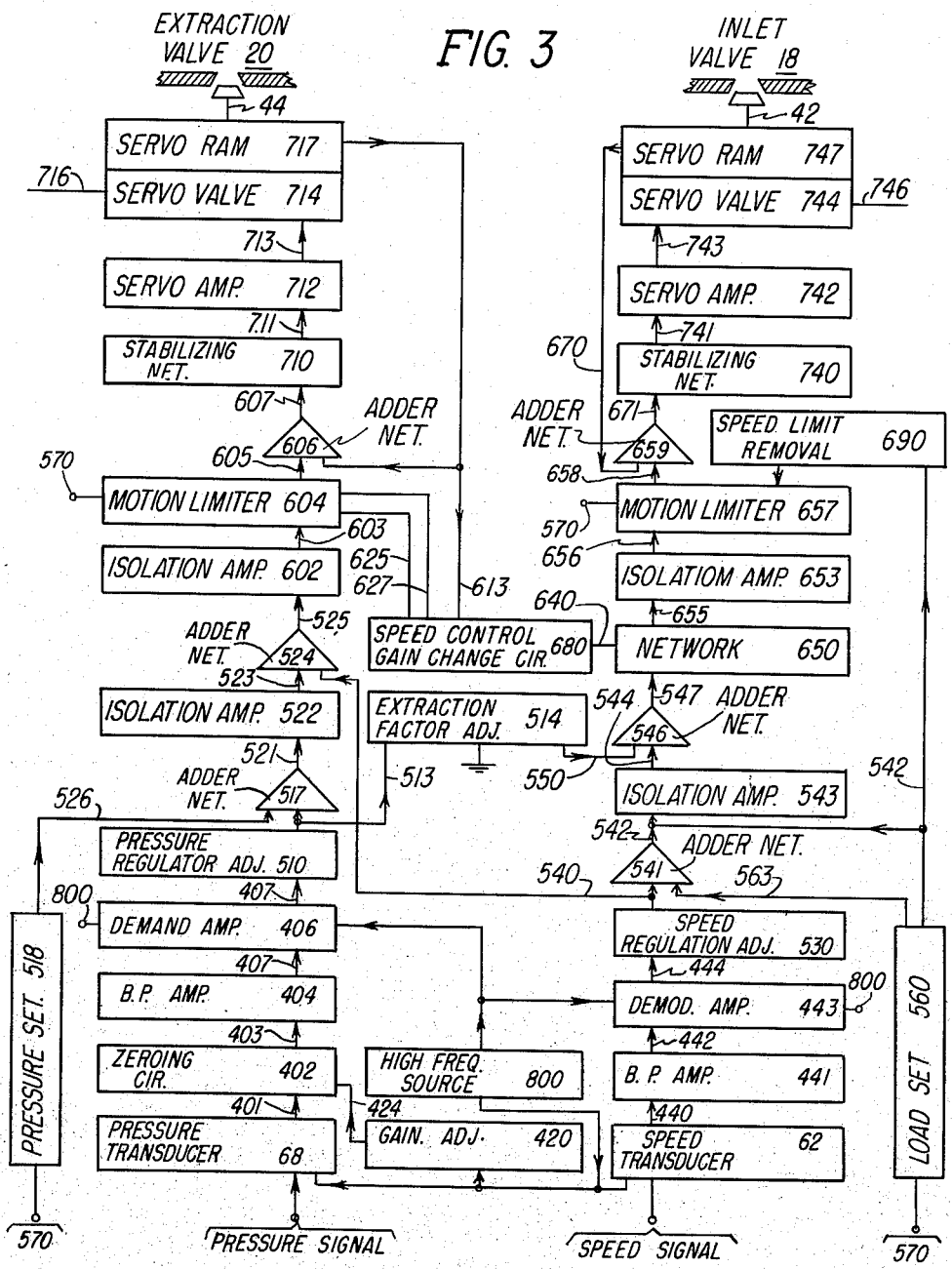

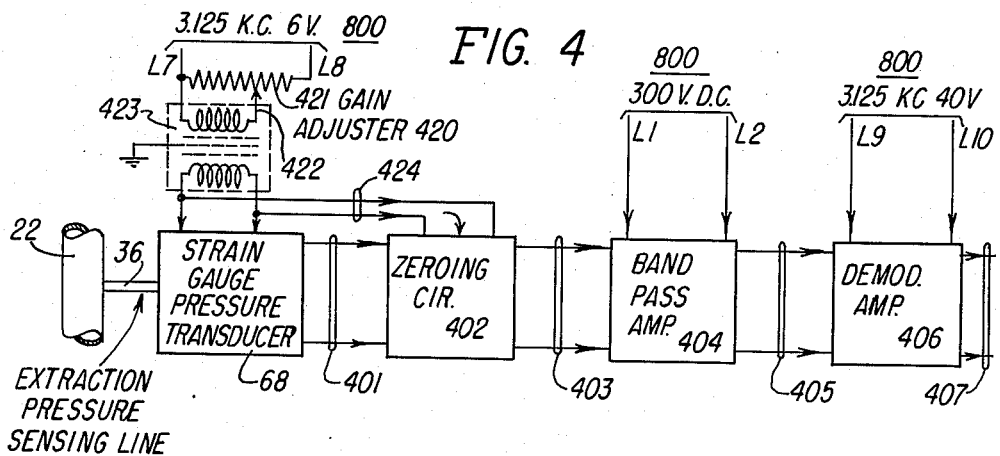
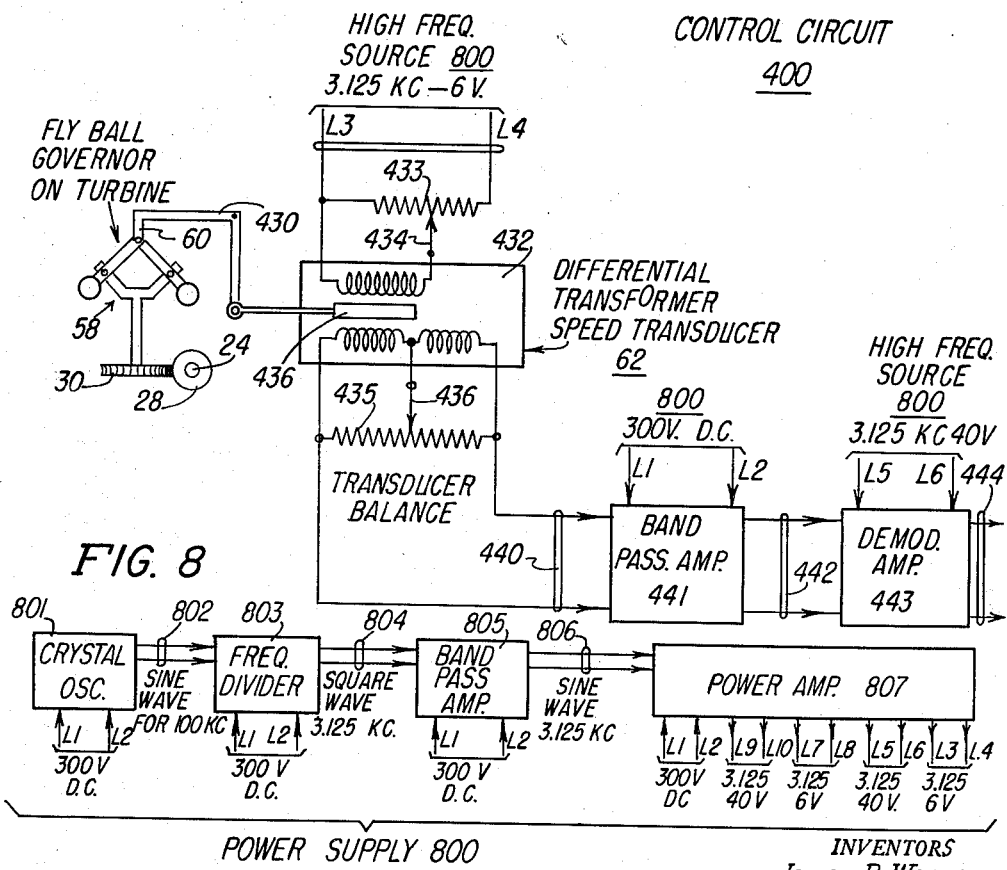

April 4, 1961 J. B. WAGNER ET AL 2,977,768
ELECTRICALLY CONTROLLED GOVERNING MECHANISMS
FOR ELASTIC FLUID TURBINES
Filed May 15, 1959 6 Sheets-Sheet 6
FIG. 7
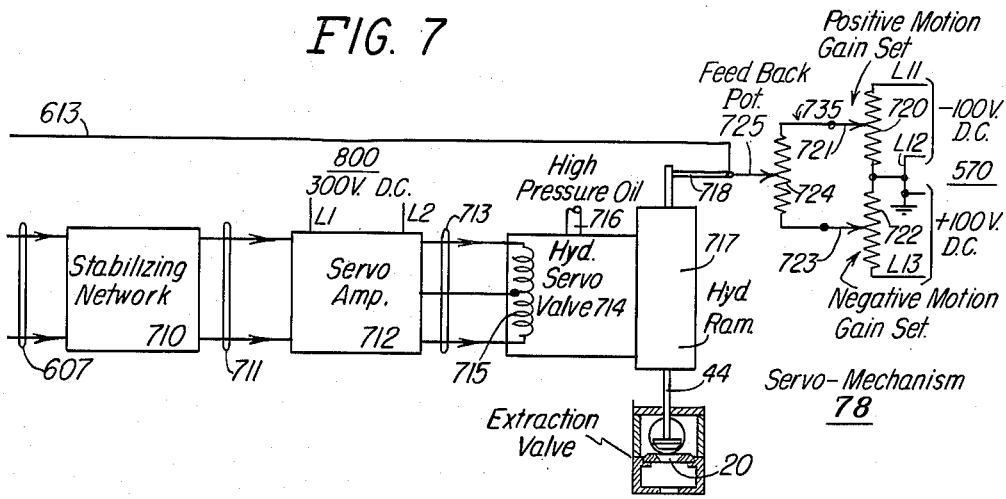
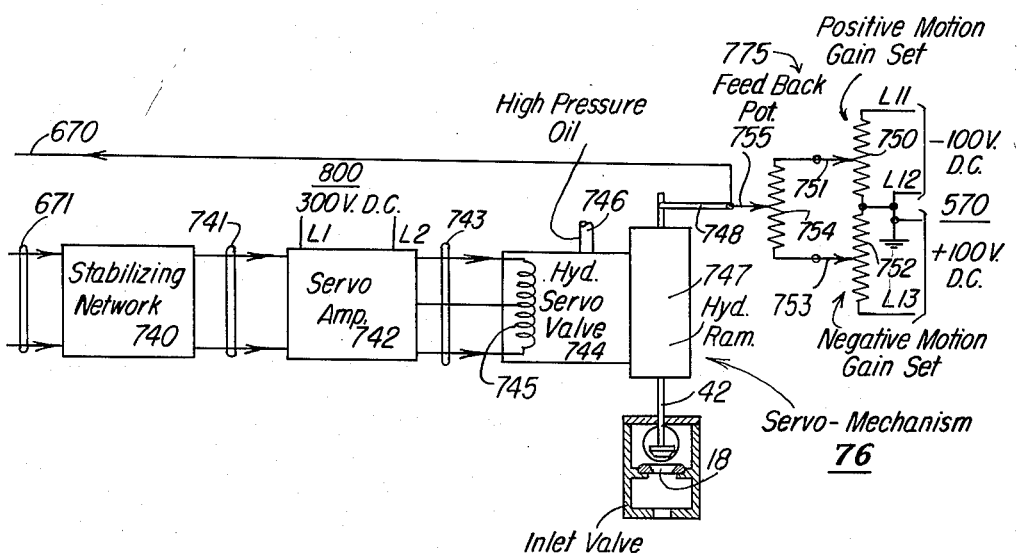
INVENTORS
James B. Wagner
Kenneth O. Straney
BY
Pringley, Baird, Clayton, Miller
& Vogel, Attys.

United States Patent Office 2,977,768
Patented Apr. 4, 1961

2,977,768

ELECTRICALLY CONTROLLED GOVERNING MECHANISMS FOR ELASTIC FLUID TURBINES

James B. Wagner, Lynnfield, and Kenneth O. Straney, Danvers, Mass., assignors to General Electric Company, a corporation of New York Filed May 15, 1959, Ser. No. 813,401

21 Claims. (Cl. 60—67)

This invention relates to governing systems for fluid turbines, and particularly to electrically controlled governing mechanisms for use with multi-stage elastic fluid turbines of the extraction and mixed pressure type.

The systems of the present invention are generally useful in controlling and governing the operation of elastic fluid turbines and the like, but are more particularly useful in the control of multi-stage turbines of the type having an extraction conduit connected to an intermediate stage thereof for removing therefrom elastic fluid under an intermediate pressure. In such a turbine, at least one of the stages has an interstage valve that cooperates with the inlet valve of the turbine to maintain substantially constant the pressure of the elastic fluid in the extraction conduit connected to such stage. Ordinarily, the elastic fluid used is steam and the steam extracted from the turbine through such conduit is employed for some useful purpose as, for example, process steam, heating steam, and the like. The present invention is also applicable when a conduit is connected to an intermediate stage of the turbine and is used to supply fluid thereto, in which case the turbine is operated as a mixed pressure turbine.

When steam is extracted from an intermediate stage of the turbine during operation thereof, it is desirable to control the regulation afforded by the inlet valve and the interstage valve in a manner such that the speed of the turbine is maintained substantially constant irrespective of any changes in the mechanical load on the turbine, and even though the demand for extracted steam varies considerably. Similarly, it is desirable to maintain the pressure of the steam in the extraction conduit at a substantially constant value despite any changes in the mechanical load imposed on the turbine shaft and despite any changes in demand for the extracted steam. From the above, it will be seen that there are many possible combinations and permutations of conditions which must be satisfactorily accommodated by the governing system.

Heretofore, the inlet valve and the interstage valve have been controlled by mechanical linkages and mechanisms which are actuated in response to changes in speed of the turbine shaft and changes in pressure of the steam in the extraction conduit. These prior mechanical systems have been reasonably satisfactory in certain installations, but there are certain limitations inherent therein, due to the utilization of mechanical linkages and other massive mechanical elements.

The complexity of the mechanical linkages results in part from the fact that the steam turbine may be large, and as a consequence thereof, the distance may be quite great between the output end of the turbine shaft where the speed governor is located and the input valve and the interstage valve. Likewise, the distance between the input valve and the interstage valve may be substantial, as may be the distance between the point along the extraction conduit at which the pressure is sensed and the location of the controls for the input valve and the interstage valve.

The speed with which such a mechanical system can react to changes in the demand for extraction steam or to changes in turbine load, is limited by the inertia of the control linkage as well as the inertia of the operating parts of the turbine. In normal operation, this may not be objectionable, but at times of rapid changes in load either on the shaft of the turbine or in the extraction or process steam conduit, any lag in reaction time may be extremely harmful to the turbine and to auxiliary components. Also, these mechanical linkage systems get out of proper adjustment and thereby fail properly to respond to desired changes in operating conditions. Further, mechanical systems must be operated immediately adjacent to the turbine, and do not lend themselves well to remote control and operation. Likewise, programmed operation such as computer-regulated systems cannot readily be utilized to control the turbine so as to integrate the turbine or steam extracted therefrom into a programmed system. The initial cost and maintenance of mechanical systems are also greater than those of systems embodying the present invention.

Accordingly, it is an important object of the present invention to provide an improved control and governing system for elastic fluid turbines of the type set forth; and more particularly, it is an object of the invention to provide an electrical control system for an elastic fluid turbine.

Another object of the invention is to provide for an elastic fluid turbine, an electrical control system which has a substantially higher rate of response to changes in operating conditions of the turbine than systems heretofore known.

Still another object of the invention is to provide an electrical control system for an elastic fluid turbine of the type having a conduit connected to an intermediate stage thereof to extract process fluid therefrom; such system providing greater accuracy of control than prior systems, both as to the speed of the turbine shaft and as to the pressure of the fluid in the conduit with varying loads on the turbine shaft and varying demands for process fluid.

Yet another object of the invention is to provide an electrical control system for an elastic fluid turbine of the type set forth which can be readily operated from remote stations.

Still another object of the invention is to provide an electrical control system for an elastic fluid turbine, in which a greater flexibility of control is afforded in combination with greater accuracy of control and higher rates of response.

A further object of the invention is to provide an electrical control system for an elastic fluid turbine which can be readily integrated with programmed systems such as those controlled by computers.

In connection with the preceding object, it is still another object of the invention to provide an electrical control system for a turbine which permits direct correlation of the turbine control function with the mechanical load and the critical speed of the turbine, so as to prevent operation of the turbine in over-speed ranges containing such critical speeds, particularly when the turbine is operating as a mechanical drive for units employing programmed starts or operations.

Further in connection with the preceding object, it is another object of the invention to provide an electrical control system for a turbine, in which an arrangement is provided to limit the rate of response of the turbine to changes of the load imposed thereon so as to confine the operation of the turbine within the physical design limitations thereof.

A still further object of the invention is to provide an electrical control system which is less expensive to build and less expensive to maintain than prior control systems.

These and other objects and advantages of the invention will be better understood from the following description when taken in conjunction with the accompanying drawings. In the drawings, wherein like reference numerals have been utilized to designate like parts throughout:

Figure 3 is a block diagram of the electrical control system of the present invention;

Figures 4, 5, 6 and 7 taken together and arranged side by side are a schematic electrical diagram of the control system of Figure 3 of the drawings; and Figure 8 is a block diagram of a portion of the power supply of the electrical control system of the present invention.

Figure 1:
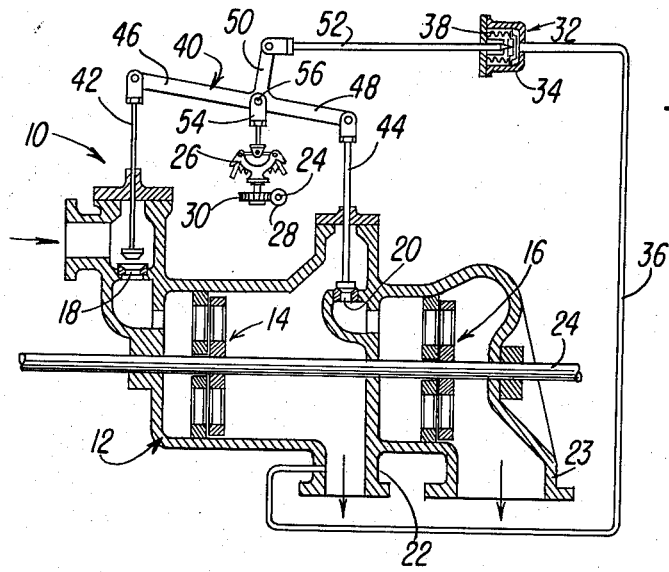
Figure 1 is a schematic view partly in section of a multi-stage turbine provided with an intermediate stage having an extraction conduit connected thereto and having an inlet valve and an interstage valve associated therewith, the control system for the valves being the mechanical governing system utilized heretofore in the prior art.

Referring now to Figure 1 of the drawings, there is illustrated an elastic fluid multi-stage extraction turbine generally designated by the numeral 10, together with a conventional control system therefor utilizing mechanical and hydraulic linkages common in the prior art. The turbine 10 comprises a casing 12 supporting a rotatably mounted output shaft 24 and includes a number of stages, two of which are respectively indicated at 14 and 16, the stage 14 preceding the stage 16. In the arrangement, the casing 12 carries the usual stationary diaphragms arranged in cooperating relation with the usual wheels rigidly secured to the output shaft 24. The casing 12 is provided with an inlet valve 18 and an interstage valve 20, the inlet valve 18 controlling the flow of elastic fluid from a boiler, or other pressure source, not shown, to the turbine stage 14, and the interstage valve 20 controlling the flow of elastic fluid from the intermediate or higher turbine stage 14 to the lower turbine stage 16. Also, the casing 12 is provided with an extraction conduit 22 that is arranged to extract elastic fluid from the casing 12 following the turbine stage 14 and immediately preceding the turbine stage 16. The casing 12 is further provided with an exhaust conduit 23 that is usually connected to a condenser, not shown. The mechanical output of the turbine 10 is taken from the output shaft 24 in any suitable manner; and ordinarily, an electric generator, not shown, is operatively connected to the output shaft 24 for the load purpose.

The governing mechanism provided to control the inlet valve 18 and the interstage valve 20 is responsive both to the speed of the shaft 24, and therefore to the load thereon, and to the pressure of the fluid in the conduit 22. The speed of the shaft 24 is sensed by a speed governor 26 that is driven from the shaft 24 by means of a worm 28 and a worm gear 30. The pressure in the conduit 22 is sensed by a device 32 which includes a casing 34 connected by a pipe 36 to the conduit 22. Disposed within the casing 34 is a bellows 38 which is moved by changes in pressure in the line 36 connected to the conduit 22.

The governor 26 in conjunction with the pressure sensing device 32 drives a three-arm lever generally designated by the numeral 40 which interconnects the valve stems 42 and 44, respectively controlling the valves 18 and 20. More specifically, the three-arm lever 40 includes a first outwardly extending arm 46 pivotally connected to the upper end of the valve stem 42 and a second arm 48 pivotally connected to the upper end of the valve stem 44. Extending upwardly from the junction of the arms 46 and 48 is a third arm 50 which is pivotally connected to a control rod 52 that, in turn, is connected to the bellows 38. The point on the lever 40 immediately below the arm 50 is connected by a link 54 at the pivot point 56 to the governor 26.

Changes in load on the shaft 24 cause corresponding changes in the speed of rotation thereof. Any change in the speed or rotation in the shaft 14 causes the centrifugal speed governor 26 to move the link 54 either upwardly or downwardly, depending on the direction of such speed change. Movement of the link 54 in this manner causes the pivot point 56 to be moved upwardly or downwardly, thereby moving the valve stems 42 and 44 by equal amounts. As a result, a substantial amount of steam can be added, for example, to increase the speed of the shaft 24, without changing the pressure in the extraction conduit 22, since opening of the valve 18 to increase the amount of steam is accompanied by an opening of the valve 20 by an amount effective to maintain the pressure constant in the stage 14. An increase in the speed of the shaft 24 will cause reverse action to take place, thereby to change the total fluid fed to the turbine 10, without changing the pressure in the extraction conduit 22.

Any change in pressure within the conduit 22 is transmitted to the pressure sensing device 32 and causes a movement of the rod 52. Movement of the control rod 52 serves to pivot the lever 40 about the pivot point 56 thereby simultaneously either to open the valve 18 and to close the valve 20, or to close the valve 18 and to open the valve 20. Accordingly any change in pressure in the extraction conduit 22 will effect an adjustment of the valves 18 and 20 with respect to each other, thereby to cause a smaller or greater flow of fluid from the turbine stage 14 through the valve 20, as may be required, to adjust the pressure within the extraction conduit 22.

The control mechanism of Figure 1 is in general capable of adequately compensating for gradual changes in the load upon the shaft 24 and changes in the demand for steam through the extraction conduit 22. The system, however, is relatively inflexible in that only two basic movements are permitted, namely pivoting of the lever 40 about the pivot point 56 and bodily vertical shifting of the lever arm 40. Various attempts have been made to impart greater flexibility to such a mechanical system, but the resultant devices have been even more complicated, and in many respects less satisfactory, than the simple governing mechanism illustrated.

Figure 2:
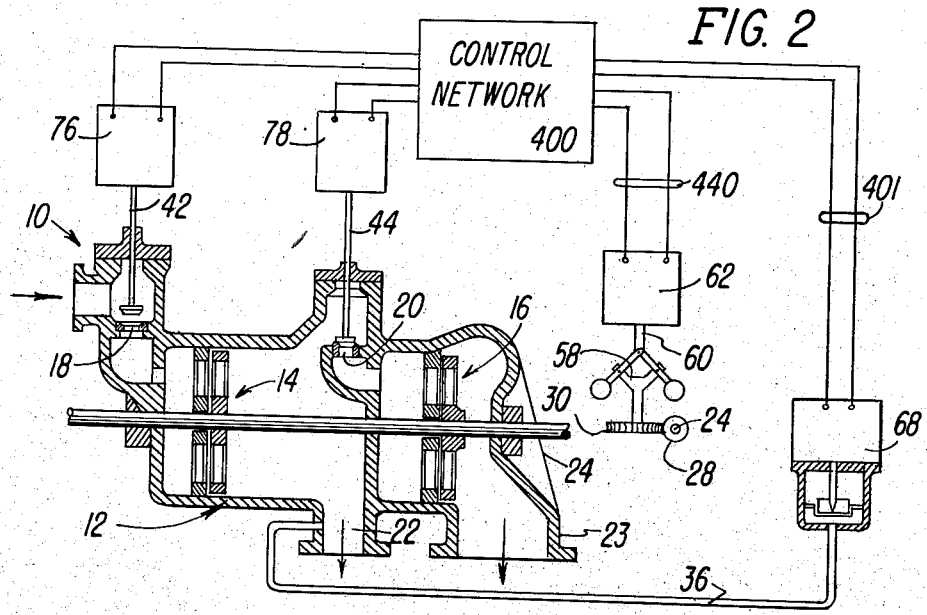
Figure 2 is a view similar to Figure 1 showing the mechanical control system replaced with the electrical control system of the present invention.

There is shown in Figure 2 of the drawing a schematic representation of the manner in which the control system of the present invention can be used to control the turbine 10 described above with respect to Figure 1; and where appropriate, the same reference numerals have been applied to designate like parts. In this structure, the shaft 24, through a worm 28 and a gear 30, drives a fly-ball governor 58. The motion of the governor 58 is transmitted through a shaft 60 to a motion transducer 62. The motion transducer 62 serves to change the speed indication appearing on the shaft 60 to a corresponding electric signal which is supplied to a control network generally designated by the numeral 400. The pressure in the extraction conduit 22 is connected through the pipe 36 to a pressure transducer 68 which serves to convert pressure in the pipe 36 to a corresponding electric signal. The pressure transducer 68 has been shown diagrammatically in the form of a strain gauge, and the electric signal therefrom is supplied to the control network 400.

As will be described in detail hereinafter, the signal from the speed transducer 62 and the signal from the pressure transducer 68 are properly amplified and combined by the control network 400 to provide control signals that are respectively supplied to suitable servo-mechanisms 76 and 78. The servo-mechanisms 76 and 78 are connected, respectively, to and drive the valve stems 42 and 44, thereby to control the valves 18 and 20 respectively.

There is shown in block form in Figure 3 the manner in which the speed signal from the fly-ball governor 58 is converted into an electric signal which is thereafter utilized to actuate the servo-mechanisms 76 and 78 to control the positions of the valves 18 and 20 and the manner in which the pressure signal in the line 36 is converted into an electric signal which is also utilized to actuate the servo-mechanisms 76 and 78 to control the positions of the valves 18 and 20. Referring first to the speed channel shown in the right portion of Figure 3, the speed signal from the fly-ball governor 58 actuates the speed transducer 62 which, for purposes of illustration, has been disclosed as a differential transformer motion transducer (see particularly Figure 4 for a schematic representation thereof). The speed transducer 62 is powered by a suitable high frequency carrier derived from a high frequency source 800, which carrier may have a frequency of, for example, 3.125 kilocycles per second. This signal is fed to the speed transducer 62 where the motion of the shaft 60 is converted into a modulation on the 3.125 kc. signal. The modulated signal is fed via a line 440 to a band pass amplifier 441 where the signal including the modulation thereof is amplified. The amplified signal is fed via a line 442 to a demodulator amplifier 443 that is also supplied with the high frequency carrier mentioned by the high frequency source 800, whereby the modulating signal is removed from the modulated carrier, and the resulting signal is amplified. The output of the demodulator amplifier 443 is fed via a line 444 to a speed regulation adjuster 530, the output of which is supplied to a line 540.

It is necessary to be able to preset the speed and load at which the turbine 10 operates; and to this end, a reference voltage source 570 is provided, and a portion of that reference voltage corresponding to the desired speed and operating load of the turbine 10 is chosen by means of a load set circuit 560. The signal on the line 540 and the voltage from the load set circuit 560 are fed to an adder network 541, the voltage from the load set circuit 560 being connected thereto via a line 563. The signals on the lines 540 and 563 are algebraically combined; and if the signal on the line 540 corresponds to the proper operating speed of the turbine 10, there is no error signal output from the adder network 541. If at any time the operating speed of the turbine 10 is different than that preset by the load set circuit 560, then there will be a resultant error signal from the adder network 541 which is fed via a line 542 to an isolating amplifier 543. The error signal on the line 542 is amplified by the amplifier 543, and the amplified error signal is fed via a line 544 to another adder network 546.

As will be described in greater detail hereafter, it is necessary when a change occurs in the pressure signal to set the valve 18 at a different position and also to adjust slightly the setting of the valve 20. To this end, a signal is fed from the pressure channel to the speed channel, that signal being injected via a line 550 into the speed channel at the adder network 546. The adder network 546 serves to combine any error signal from the pressure channel appearing on the line 550 and any error signal appearing on the line 544. The combined error signal is then fed via a line 547 to a network 650; and from the network 650 two portions of the combined error signal are respectively supplied to two lines 655a and 640, the line 655a being connected to a stabilizing network 655, and therefrom via a line 655b to an isolating amplifier 653.

The amplified signal from the amplifier 653 is supplied to a line 656 and is fed to a motion limiter circuit 657, which has been illustrated in the drawings as being of the diode clipper type. The purpose of the motion limiter 657 is to limit the error signal passed thereby so that the steady state position of the valve 18 is positively established, and so that the rate of movement of the valve 18 into its steady state position does not exceed a predetermined value. The signal from the motion limiter 657 is fed via a line 658 to an adder network 659, where it is combined with a feedback signal from a line 670, the feedback signal on the line 670 being produced by movement of the servo-mechanism 76 in response to an error signal from the adder network 659. Any error signal from the adder network 659 is fed via a line 671 to a stabilizing network 740, and therefrom via a line 741 to a servo-amplifier 742. The servo-amplifier 742 feeds an amplified signal via a line 743 to an electro-hydraulic valve 744 forming a part of the servo-mechanism 76, the valve 744 controlling a servo-ram 747; and the servo-ram 747 is connected to the valve stem 42, thereby to control the position of the inlet valve 18.

Referring now to the left or pressure signal channel in Figure 3, it will be seen that the pressure transducer 68 is also driven by the high frequency source 800, whereby the 3.125 kc. carrier is supplied thereto. The output from the pressure transducer 68 is a modulated 3.125 kc. signal which is fed via a line 401 to a zeroing circuit 402. A gain adjuster 420 is also coupled with the high frequency carrier from the high frequency source 800, and the output of the gain adjuster is also supplied via a line 424 to the zeroing circuit 402. The zeroing circuit 402 combines these input signals and the output signal therefrom is fed via a line 403 to a band pass amplifier 404 which serves to amplify the modulated 3.125 kc. signal. This amplified and modulated signal is fed via a line 405 to a demodulator amplifier 406 where the signal is demodulated to produce an error signal that is supplied to a line 407. Only a portion of the output from the demodulator amplifier 406 may be desired to drive the succeeding circuits from the pressure channel; and to this end, a pressure regulator adjuster 510 is provided so that a predetermined amount of the error signal from the demodulation amplifier 406 can be fed to succeeding circuits. Specifically, the line 407 is connected to the input of the pressure regulating adjuster 510, and the output thereof is connected to a line 513. Also, an extraction factor adjuster 514 is provided, the input of which is connected to the line 513, and the output of which is connected to the previously mentioned line 550 that supplies the adder network 546 provided in the speed channel. The signal on the line 550 serves to inject a portion of the pressure error signal into the speed channel, thereby to effect a compensating movement of the valve 18 when the valve 20 is actuated because of a change in the pressure in the extraction conduit 22.

Also, the line 513 extending from the output of the pressure regulation adjuster 510 is connected to an adder network 517. The signal on the line 513 is compared with a standard signal derived from a pressure set circuit 518 which is connected to a source 303 of reference D.C. potential. The pressure set circuit 518 is adjustable, thereby to predetermine the pressure that will be maintained in the extraction conduit 22. The standard or reference signal from the pressure set circuit 518 is fed via a line 526 as a second input to the adder network 517. The adder network 517 algebraically adds the signals on the lines 513 and 526. If the signal in the line 513 corresponds to the desired operating pressure within the extraction conduit 22, there is no error signal from the adder network 517. On the other hand, if the signal on line 513 is different than that corresponding to the desired operating pressure in the extraction conduit 22, then there will be an error signal in the output of the adder network 517 which will appear on the line 521.

The error signal on the line 521 is fed to an isolating amplifier 522 where the signal is amplified, after which it is fed via a line 523 to another adder network 524 as one of the inputs thereto. A second input to the adder network 524 is derived from the speed channel through the previously mentioned line 540 which is connected to the output of the speed regulation adjuster 530. The signal on the line 540 will serve to cause a compensating movement of the valve 20 when the valve 18 is moved by operation of the speed signal channel, if this is necessary.

The combined error signal from the adder network 524 is fed via a line 525a to a stabilizing network 525, and therefrom via a line 525b to an isolation amplifier 602 where the error signal is amplified. After amplification, the combined error signal is fed via a line 603 to a motion limiter 604 of the diode clipper type. The purpose of the motion limiter 604 is to limit the error signal passed thereby so that the steady state position of the valve 20 is positively established, and so that the rate of movement of the valve 20 into its steady state position does not exceed a predetermined value.

The output from the motion limiter 604 is fed via a line 605 to an adder network 606 where the error signal on the line 605 is combined with a feedback signal from the servo-mechanism 78 appearing on a line 613. Any error signal from the adder network 606 is fed via a line 607 to a stabilizing network 710, and therefrom via a line 711 to servo-amplifier 712. The servo-amplifier 712 feeds an output signal via a line 713 to an electrohydraulic valve 714 forming a part of the servo-mechanism 78. The valve 714 controls a servo-ram 717; and the servo-ram 717 is connected to the valve stem 44, thereby to control the position of the extraction valve 20.

There is shown in Figure 8 a schematic diagram of the high frequency source 800 for the control system. A D.C. power supply (not shown) supplies reference potentials of 300 volts D.C. a +100 volt D.C. and a —100 volt D.C.; which should be well regulated. For convenience in the drawings, the lines carrying the 300 volt D.C. potential are designated L1 and L2; the lines carrying the +100 volt reference potential are designated L11 and cooperate with a grounded line designated L12; and the lines carrying the —100 volt reference potential are designated L13 and cooperate with the grounded line L12. The 300 volt D.C. potential is used to power a crystal oscillator 801 which generates an A.C. sine wave signal having a frequency of 100 kc. The oscillator 801 also serves as a voltage amplifier and the output thereof is a 30 volt sine wave having a frequency of 100 kc. The 100 kc. signal is fed from the oscillator 801 via a line 802 to a frequency divider 803. The frequency divider 803 may be, for example, a Schmitt trigger driving five series coupled bi-stable multivibrators acting as frequency dividers. The result is an output having a frequency of 3.125 kc. and having a square wave shape. The 3.125 kc. square wave is fed via a line 804 to a band pass amplifier 805 tuned to 3.125 kc. to pass the fundamental frequency of the square wave input. The output from the amplifier 805 is a 3.125 kc. sine wave and may have an amplitude of 40 volts appearing on a line 806. The line 806 feeds the 3.125 kc. sine wave into a class A power amplifier 807 which amplifies the signal and provides two separate 40 volt outputs at a frequency of 3.125 kc. which appear on lines designated L5—L6 and L9—L10, and two separate 6-volt 3.125 kc. sources appearing on lines L3—L4 and L7—L8. The 6-volt 3.125 kc. power on the lines L3—L4 is used to energize the speed transducer 62, and the 6-volt 3.125 kc. power on the lines L7—L8 is used to energize the pressure transducer 68. The 40-volt 3.125 kc. power on the lines L5—L6 supplies the speed channel demodulator 443 as a reference carrier, and the 40-volt 3.125 kc. power on the lines L9—L10 supplies the pressure channel demodulator amplifier 406 as a reference carrier.

Referring now to Figures 4 to 7, inclusive, the control circuit of the present invention will be described in greater detail. The speed control channel has been arranged along the bottoms of Figures 4 to 7, inclusive; and the pressure signal channel has been arranged along the tops of Figures 4 to 7, inclusive; whereby the positions of the various parts of the channels correspond substantially to the positions thereof in Figure 3, as described above. The fly-ball governor 58 drives through the shaft 60 a lever 430 which is pivotally connected to a movable magnetic core 431 of a differential transformer 432 forming a part of the speed transducer 62. The primary winding of the differential transformer 432 is powered by the 6-volt 3.125 kc. source via the lines L3—L4, only a portion of that supply being taken from a potentiometer 433. The movable contact 434 on the potentiometer 433 is adjustable, thereby to set or adjust the gain or excitation level of the speed transducer 62. The secondary winding of the differential transformer 432 has a resistor 435 connected thereacross; and a movable contact 436 on the resistor 435 is connected to a center tap on the secondary winding mentioned. The movable contact 436 provides a balance control or adjustment for the transformer 432.

It will be understood that the signal induced by the primary winding of the transformer 432 into the secondary winding thereof depends upon the position of the magnetic core 431 between the primary winding and the secondary winding of the transformer 432. Thus, the signal from the secondary winding of the transformer 432 corresponding to the condition of the fly-ball governor 58 will appear on the line 440 feeding the band pass amplifier 441.

The band pass amplifier 441 is an A.C. voltage amplifier tuned to 3.125 kc. Accordingly, substantially only the signal on the line 440 is passed by and amplified by the amplifier 441. The gain of the amplifier 441 may be 60, for example.

The output from the amplifier 441 is fed via the line 442 to the demodulator amplifier 443 as one of the inputs thereto. Another of the inputs to the demodulator amplifier 443 is the 40-volt 3.125 kc. carrier from the high frequency source 800. The demodulator amplifier 443 is both voltage and phase sensitive, and may have a nominal gain of unity.

The output from the demodulator amplifier 443 appears on the line 444 (see also Fig. 5) which feeds the signal to a resistor 531 forming a part of the speed regulation adjuster 530. The resistor 531 has a movable contact 532 which places a portion of the voltage appearing across the resistor 531 onto the line 540. A portion of the signal from the line 540 is fed to the adder network 524 in the pressure channel, as will be described in greater detail hereafter. Another portion of the signal on the line 540 is fed to the adder network 541 where it is combined with a voltage supplied from the load set circuit 560. More particularly, the reference source 570 includes a resistor 571 which is connected to the +100 volt reference potential supply at one end thereof. A movable contact arm 572 is provided for the resistor 571 and connects with a resistor 561 that is connected at the other end to the ground line L12. A movable contact 562 is provided for the resistor 561, and it is this potential derived from the arm 562 that is fed as the other input to the adder network 541. The resistor 561 and the contact 562 comprise the load set circuit 560, and movement of the contact 562 changes the predetermined load and speed under which the turbine 10 operates. The function and operation of the resistor 571 and the contact 572 thereon will be described more fully hereinafter.

The output from the adder network 541 is fed via the line 542 to the isolating amplifier 543. The isolating amplifier 543 is an impedance isolating D.C. amplifier having a voltage gain of 2, for example. The amplified signal from the amplifier 543 is fed via the line 544 to the adder network 546. The adder network 546, may be, for example, a resistor mesh adder network which combines the signal on the line 544 with the signal on the line 550 which is derived from the pressure channel. The combined signal from the adder network 546 is fed via the line 547 to a network 650 including a pair of resistors 651 and 652 connected in series with each other (see Fig. 6).

The portion of the signal appearing across the resistor 652 is fed via the line 655a to the stabilizing network 655, and therefrom via the line 655b to the isolation amplifier 653; and the amplified signal from the amplifier 653 is fed via the line 656 to the motion limiter or diode clipper 657. The stabilizing network 655 is a resistance-capacitance lag network which is constructed to provide stable operation of the motion limiter 657. The amplifier 653 is an impedance isolating amplifier having a voltage gain of 8, for example. The diode clipper 657 is biased to limit both the positive output voltage and the negative output voltage therefrom, the maximum positive voltage passing therethrough being established by a resistor 664 connected from the +100 volt reference potential source L11 to ground through a pair of relay contacts 661. A movable contact 663 is provided for the resistor 664 and connects through a line 666 to supply the positive voltage limit for the diode clipper 657. As will be better understood later, the position of the contact 663 can be moved to provide any desired positive potential from 0 to +100 volts, and serves to predetermine or preset the steady state upward position of the valve 18, as well as the rate of upward movement thereof. The bias for the clipper 657 to predetermine or preset the steady state downward position of the valve 18, as well as the rate of downward movement thereof, is derived from a resistor 665 connected from the −100 volt reference potential source L13 to ground through a pair of relay contacts 662. The resistor 665 is provided with a movable contact 654 which is connected via a line 667 to the diode clipper 657. By moving the contact 654 along the resistor 665, any desired negative bias may be provided for the diode clipper 657 from 0 to −100 volts, thereby to adjust the negative signal derived therefrom. The relay contacts 661 and 662, when opened, respectively provide the full +100 volts and the full −100 volts to the diode clipper 657 for purposes which will be explained more fully hereafter.

The output from the diode clipper 657 appears on the line 658 and is fed to the adder network 659. The adder network 659 serves to combine the limited or clipped error signal from the diode clipper 657 with the feedback signal appearing on the line 670. The resultant signal is fed via the line 671 to the stabilizing network 740 (see Figure 7). The stabilizing network 740 is a resistance-capacitance lag network which is constructed to provide stable operation of the servo-mechanism 76. The error signal from the stabilizing network 740 is fed via the line 741 to the servo-amplifier 742. The amplifier 742 is a push-pull, class A, D.C. power amplifier, and the gain thereof comprises a differential output of 250 milliamperes for each volt of the input potential thereto.

The output from the amplifier 742 is fed via the line 743 to the hydraulic servo-valve 744, and specifically to the control solenoid 745 thereof. The valve 744 is supplied with oil under high pressure through a line 746 and controls the hydraulic ram 747. The flow rate through the servo-valve 744 is, for example, 0.5 cubic inch per second per differential milliampere of input current. The ram 747 has a size such that it can provide the force requirements to operate the stem 42 of the input valve 18.

A feedback circuit is provided and is generally designated by the numeral 775 in Figure 7. Two resistors 750 and 752 are connected in series across the −100 volt reference potential and the +100 volt reference potential, respectively. The resistor 750 is provided with a movable contact 751 which provides an adjustment to control the positive ram motion gain. A similar movable contact 753 is provided for the resistor 752 to provide a control for the negative ram motion gain. A resistor 754 interconnects the contacts 751 and 753 and is provided with a movable contact 755. The contact 755 is carried by a shaft 748 which moves with the piston of the hydraulic ram 747 and the valve stem 42, whereby movement of the piston of the ram 747 causes movement of the contact 755 along the resistor 754. The line 670 affords an electrical connection from the contact 755 to apply the potential thereon as an input to the adder network 659 described above. The resistor 754 and the contact 755 therefore serve as a feedback potentiometer, whereby the motion of the piston of the ram 747 is fed back to decrease the error signal fed from the adder network 659 to the line 671 so that there will be no further motion of the valve 18 when it arrives at the required new position.

Referring now to the upper portions of Figures 4, 5, 6 and 7, a more detailed explanation of the pressure control channel will be given. The extraction conduit 22 has been diagrammatically illustrated in Figure 4 as being connected by the pipe 36 to the pressure transducer 68 which has been illustrated as being of the strain gauge pressure-responsive type. The transducer 68 employs a four-arm bridge actuated by a diaphragm. The bridge is powered from the 3.125 kc. 6-volt source appearing on the lines L7—L8, that signal being impressed across a resistor 421 provided with a movable contact 422. The contact 422 can have the position thereof adjusted so as to provide a gain adjuster 420 for the pressure transducer 68. The portion of the signal appearing between the line L7 and the contact 422 is fed as an input to the primary winding of an isolation transformer 423. The secondary winding of the transformer 423 is connected as the energizing input to the strain gauge of the pressure transducer 68. The gain of the pressure transducer 68 is, for example, a 0.2 millivolt output for each 1½% change in the pressure applied through the pipe 36, the pressure change being with respect to a predetermined steam pressure.

The desired operating pressure is set by means of the zeroing circuit 402. The zeroing circuit 402 includes a bridge network having as one of the inputs thereto the signal from the pressure transducer 68, which appears on the line 401, and having as the other input thereto the 3.125 kc. signal from the secondary of the transformer 423 which is fed therebetween via the line 424. The zeroing circuit 402 is a bridge circuit which can be adjusted to provide a zero output voltage on the line 403 at any selected base or operating pressure.

Any pressure differential signal on the line 403 is amplified by the band pass amplifier 404. The amplifier 404 is an A.C. voltage amplifier tuned to the 3.125 kc. frequency, and the gain therethrough is, for example, 1,000. The amplified signal from the amplifier 404 is fed via the line 405 to the demodulator amplifier 406. A second input to the amplifier 406 is the 40-volt 3.125 kc. carrier appearing on the lines L9—L10. The demodulator is sensitive to both voltage and phase, and has, for example, a gain of unity.

The demodulated signal from the amplifier 406 is fed via the line 407 to the pressure regulator adjuster 510, which is in the form of a potentiometer including a resistor 511 having a cooperating movable contact 512. The contact 512 is movable to select a predetermined portion of the signal across the resistor 511 and to apply that selected portion of the signal via the line 513 to the adder network 517.

The adder network 517 is a resistor mesh which algebraically adds the input appearing on the line 513 and the voltage derived from the pressure set circuit 518. The pressure set circuit 518 includes a resistor 519 which is connected across the +100 volt reference potential. A movable contact 520 is provided for the resistor 519 to derive or to select a potential therefrom at some value between 0 volts and +100 volts, which selected portion of the reference potential is fed via the line 526 as the second input to the adder network 517. By means of the pressure set circuit 518, any predetermined operating pressure in the extraction conduit 22 can be selected for the operating pressure therein, and the control circuit will function to maintain the pressure in the extraction conduit 22 at such predetermined value.

Any error signal from the adder network 517 is fed via the line 521 to the isolating amplifier 522. The isolating amplifier 522 is an impedance isolating D.C. amplifier and has a gain of 50, for example. The amplified error signal is fed via the line 523 to the adder network 524 as one of the inputs thereto. As will be explained more fully hereinafter, the second input to the adder network 524 is derived from the speed channel, and specifically from the speed regulation adjuster 530, and is applied via the line 540.

The output from the adder network 524 appears on the line 525a and is fed to the stabilizing network 525, and therefrom via the line 525b to the isolation amplifier 602; and the amplified signal from the amplifier 602 is fed via the line 603 to the motion limiter or diode clipper 604. The stabilizing network 525 is a resistance-capacitance lag network which is constructed to provide stable operation of the motion limiter 604. The amplifier 602 is an impedance isolating amplifier having a voltage gain of 8, for example. The diode clipper 604 has a double bias and serves to clip both the positive going and the negative going portions of the inputs thereto so as to predetermine or preset both the upward steady state position and the downward steady state position of the extraction valve 20, as well as the rates of upward and downward movements thereof. The limit for the upward steady state position of the extraction valve 20, as well as the rate of upward movement thereof, is provided by a potentiometer including a resistor 608 having a cooperating movable contact 609. The resistor 608 is connected across the +100 volt reference potential, and the contact 609 is movable to select any portion of the reference potential from 0 volts to +100 volts. The portion of the reference potential selected by the contact 609 is fed to the diode clipper 604 to preset the upward steady state position of the extraction valve 20, as well as the rate of upward movement thereof, as previously noted.

A similar arrangement is provided to establish or preset the downward steady state position of the extraction valve 20, as well as the rate of downward movement thereof; which arrangement comprises a potentiometer including a resistor 611 and movable contact 612 cooperating therewith. The resistor 611 is connected across the —100 volts reference potential, whereby the contact 612 can select any potential thereon from 0 volts to —100 volts. The selected potential is fed to the diode clipper 604 to preset the steady state downward position of the extraction valve 20, as well as the rate of downward movement thereof, as previously noted.

The clipped signal is fed via the line 605 to the adder network 606, where this signal is combined with the feedback signal appearing on the line 613. The adder network 606 is also a resistor mesh that serves to combine the signals on the lines 605 and 613. The resultant signal, if any, is fed from the adder network 606 via the line 607 to the stabilizing network 710. The stabilizing network 710 is a resistor-capacitor lag network with the values of the component parts selected to provide stable operation of the servo-mechanism 78. The output of the stabilizing network 710 is fed via the line 711 to the servo-amplifier 712. The amplifier 712 is a push-pull, class A D.C. power amplifier, and the gain thereof is, for example, 250 milliamperes differential in output current for each volt of input potential.

The output of the amplifier 712 is fed to the winding 715 forming a part of the electro-hydraulic servo-valve 714. The valve 714 is supplied with and controls the application of high pressure oil derived from a line 716. Upon actuation of the valve 714, oil under pressure is fed to the hydraulic ram 717 which is connected to the valve stem 44 of the extraction valve 20. The flow gain of the valve 714 is, for example 0.5 cubic inches of oil for each differential milliampere of input current. The hydraulic ram 717 has a size such that it can impart the necessary operating forces to the valve stem 44 of the extraction valve 20.

Changes in the position of the hydraulic arm 717, and therefore of the extraction valve 20, are fed back via the line 613 to the adder network 606. The feedback signal is derived from a feedback circuit generally designated by the numeral 735, which includes a pair of potentiometers. One of the potentiometers includes a resistor 720 connected across the —100 volt D.C. reference potential, and is provided with a movable contact 721. The other of the potentiometers includes a resistor 722 connected across the +100 volt D.C. reference potential, and is provided with a movable contact 723. Connected between the contacts 721 and 723 and forming an electrical connection therewith is a resistor 724 forming a part of a potentiometer having a movable contact 725. The position of the contact 725 along the resistor 724 is controlled by the position of the piston of the ram 717 through a mechanical connection 718 between the piston of the ram 717 and the contact 725. Electrical connection is made with the contact 725 by the feedback line 613 described above. The resistor 720 in cooperation with the contact 721 provides an adjustment to set the rate of valve motion in the upward direction for the extraction valve 20. The resistor 722 in cooperation with the contact 723 provides an adjustment to set the rate of valve motion in the downward direction for the extraction valve 20. The contact 725 will feed back a potential through the line 613 which corresponds to the position of the extraction valve 20, thereby to reduce the error signal to zero when the extraction valve 20 arrives at the newly adjusted position, the comparing of the feedback signal on the line 613 and the error signal on the line 605 being accomplished by the adder network 606.

In order to protect the turbine 10 and the associated operating parts, it is desirable to increase the rate of response of the speed control channel when the extraction valve 20 reaches the limit of movement thereof in either direction. Such a control is provided by a speed control gain change circuit generally designated by the numeral 680 in Figure 6. More particularly, the speed control gain change circuit 680 includes a pair of series-connected resistors 621 and 622 that are respectively connected to the +100 volt reference source and to the —100 volt reference source; whereby the resistors 621—622 are connected in parallel to the resistors 608—611 forming the supply connections to the motion limiter 604 in the pressure channel. A movable contact 624 is provided on the resistor 621, and is mechanically ganged by a connection 620 with the movable contact 609 on the resistor 608; and a movable contact 626 is provided on the resistor 622 and is mechanically ganged by a connection 626 with the movable contact 612 on the resistor 611. Accordingly, the limit setting for the rate of upward motion of the extraction valve 20 established by the position of the contact 609 is similarly applied to the contact 624 ganged therewith. Likewise, the limit setting for the rate of downward motion of the extraction valve 20 established by the position of the contact 612 is similarly applied to the contact 626 ganged therewith.

The potential on the contact 624 is fed via a conductor 625 as one of the inputs to a differential amplifier 633; and another input to the differential amplifier 633 is derived from the feedback line 613 on which appears the potential corresponding to the position of the extraction valve 20. The differential amplifier 633 has an input circuit consisting of a high impedance resistor mesh which algebraically combines the potentials on the conductor 625 and on the line 613. When the difference between these two input signals to the amplifier 633 indicates that the extraction valve 20 has arrived at the uppermost limit of travel thereof (its fully open position), then an output signal is derived from the amplifier 633 which is fed through a diode gate 632 to drive a relay amplifier 639. The amplifier 639 is a D.C., class A, power amplifier having a gain, for example, of 50 milliamperes output for each volt of input. The amplifier 639 drives a relay coil 630 controlling a pair of contacts 631. When the relay coil 630 is energized, the contacts 631 are closed so as to short out via the conductors of a line 640 the network 650 included in the speed control channel, with the result that the entire output of the adder network 546 is applied as an input to the isolating amplifier 653. The net effect of the above action is to increase the gain of the speed control channel so as to compensate for the fact that there can be no additional upward movement of the extraction valve 20, thereby to cause a faster rate of response of the inlet valve 18.

The potential on the contact 626 is fed via a conductor 627 as one input to a second differential amplifier 634, which is substantially identical to the differential amplifier 633. Another input to the amplifier 634 is derived from the feedback line 613. The amplifier 634 is arranged such that when the extraction valve 20 has arrived at the lowermost limit of travel thereof (its fully closed position), then an output signal therefrom is applied through a diode gate 635 to a relay amplifier 636 identical to the relay amplifier 639. The relay amplifier 636 drives a relay coil 637 controlling a pair of contacts 638. When the relay coil 637 is energized, the contacts 638 are closed so as to short out via the conductors of the line 640 the resistor 651, for the purpose explained above. Accordingly, the gain of the speed control channel is again increased, when there can be no additional downward movement of the extraction valve 20, thereby to cause a faster rate of response of the inlet valve 18.

In certain instances, it may be desirable to increase the gain through the pressure channel when the inlet valve 18 has reached its fully open position or its fully closed position; whereby it is to be understood that a pressure control gain change circuit would thus be provided, similar to the speed control gain change circuit 680 described above. More specifically, a voltage divider network similar to the network (including the resistors 621 and 622) could be provided in the line 525a. Circuits then could be provided to cut out a portion of the voltage divider resistance in accordance with a signal derived from the feedback line 670, thereby to change the gain in the pressure control channel to compensate for the fact that the inlet valve 18 is in the fully open position or the fully closed position thereof, as described above.

Figure 5:
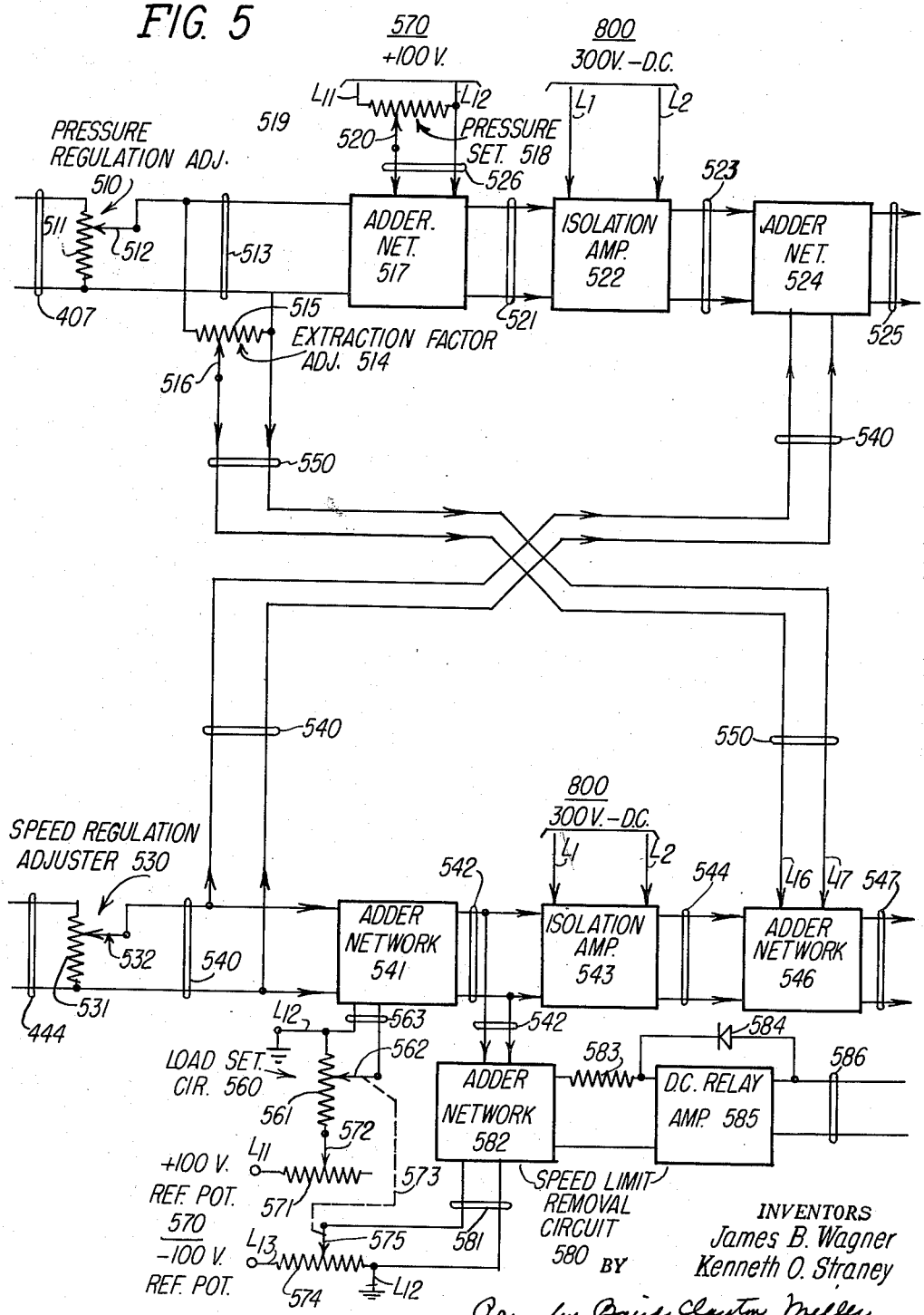
Figure 6:
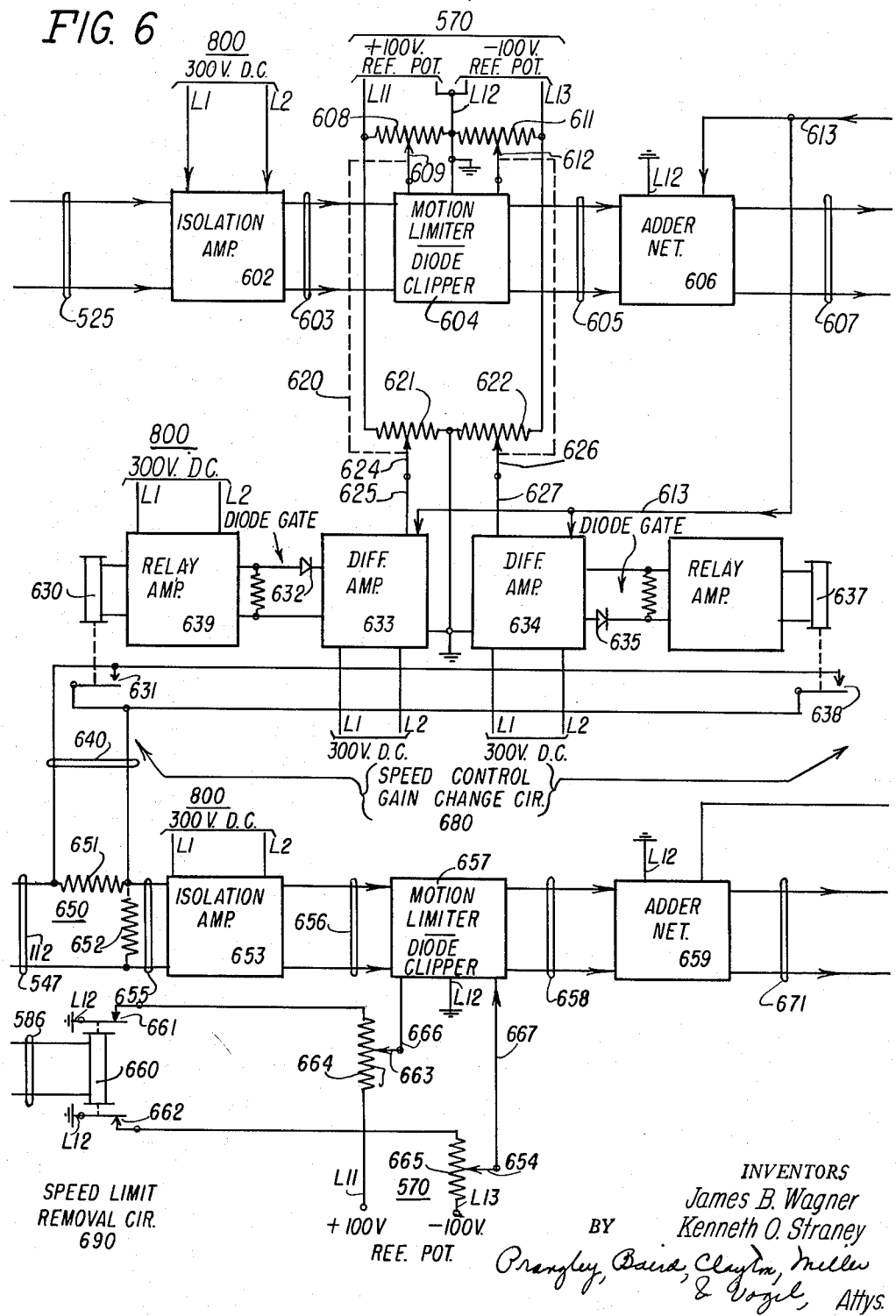

It is also desirable under certain conditions to remove the limits on the rate of travel of the inlet valve 18 when the speed error signal exceeds a certain preselected value. This would occur, for example, if there should occur a sudden drop in load on the shaft 24 of the turbine 10. Referring to Figures 5 and 6, such a speed limit removal circuit has been provided and is generally designated by the numeral 690. The speed limit removal circuit 690 is connected to the load set circuit 560 and to the line 542 so that it can detect error signals exceeding a certain preselected value, and after suitably detecting and amplifying the error signal feeds a signal to the motion limiter or diode clipper 657, and particularly to govern the bias controls thereof so as to eliminate the normal limiting or clipping action of the motion limiter 657 with respect to the rate of movement of the inlet valve 18.

Referring first to Figure 5, there is provided a potentiometer including a resistor 574 connected between the −100 volt D.C. reference potential and ground potential. A movable contact 575 is provided for the resistor 574, and the potential thereon is connected via a line 581 to an adder network 582 as one of the inputs thereto. A mechanical connection 573 is provided between the movable contacts 562 and 575 to provide for simultaneous or ganged adjustment thereof. The contact 562 in the load set circuit 560, therefore, controls the comparison voltage which is obtained on the contact 575. The potentiometer including the resistor 571 and the contact 572, which has been described heretofore, provides the positive speed error limit removal adjustment. Movement of the contact 572 in a direction to increase the resistance between the +100 volt source L11 and the ground conductor L12, serves to increase the amount of positive speed error that may exist before removing limit on the rate of travel of the inlet valve 18. Conversely, decreasing the resistance setting of the contact 572 decreases the amount of positive speed error that may exist before removing the limit on the rate of travel of the inlet valve 18.

A second input is provided for the adder network 582 in addition to the comparison voltage derived from the contact 575. This second input to the adder network 582 is the signal appearing on the line 542, and is connected to the adder network 582. The adder network 582 is a resistor mesh network which serves algebraically to add the potentials on the lines 581 and 542. The output from the adder network 582 is fed through a resistor 583 to a D.C. relay amplifier 585. The amplifier 585 is a class A power amplifier having a gain, for example, of 50 milliamperes output per volt of input. In addition, the amplifier 585 advances the phase by 180 electrical degrees of the signal fed thereto. A diode 584 is connected across the relay amplifier 585 to produce a high sensitivity to positive outputs from the adder network 582 and a high degree insensitivity to negative outputs therefrom.

The amplified positive signals from the amplifier 585 are fed via a line 586 to a relay coil 660 controlling two pairs of contacts 661 and 662. Energization of the relay coil 660 serves to effect opening of the contacts 661 and 662. This removes ground potential from the ends of the resistors 664 and 665, respectively, thereby to apply substantially the full +100 volts on the line 666 and substantially the full −100 volts on the line 667 extending to the diode clipper 657. As a result, the diode clipper 657 is rendered substantially inoperative to perform its clipping function; whereby the full error signal is fed to the adder network 659 and eventually to the servo-mechanism 76. As a result, the inlet valve 18 can be moved rapidly in response to a drop in load on the shaft 24 so as to move the inlet valve 18 toward its closed position.

The various amplifiers used in the control circuit may employ vacuum tubes as the amplifying elements therein. Alternatively, transistor amplifying circuits or magnetic amplifying circuits may be used. When magnetic amplifying circuits are utilized, the function of the adder networks can be performed by multiple input or control windings.

Other devices may be used to perform the function of the speed transducer 62 and the pressure transducer 68. In general, any device for converting mechanical movement into an electric signal can be utilized. Alternative to the speed transducer of the differential transformer type and the pressure transducer of the strain gauge type, as illustrated, a conducting plastic potentiometer or a capacitance gauge bridge, or the like, may be used; in which case, other and different auxiliary circuitry may be employed in place of that illustrated. Other means may also be used to provide the transducer excitation voltages and the demodulator reference voltages. For example, tuning forks, electronic oscillators, high stability phase shift oscillators, or the like, may be used in place of the oscillator illustrated. Direct current excitation of the strain gauge bridge circuit 68 is possible, if D.C. amplification is used instead of the A.C. amplification and demodulation illustrated.

The motion limiters or diode clippers 657 and 604 may be replaced with multiple biased diode resistance adder meshes which permit selecting the gain changes performed by the speed control gain change circuit 680, as well as the limiting functions of operation as various input voltage levels are reached. Equal gain changes have been illustrated utilizing the circuit 680 when either limit of travel of the extraction valve 20 is reached. Under certain circumstances, unequal gain changes may be required. In such cases, separate voltage divider circuits may be provided for the two limits in place of the common voltage divider network, including the resistors 621 and 622 illustrated.

Instead of the simple potentiometer resistors 754 and 724 illustrated in the feedback potentiometers, a plurality of fixed taps may be provided along the length thereof. External resistors connected between various ones of the taps would provide means for producing variations in potentiometer resistance with motion so as to compensate for the non-linear flow or pressure control of the valves 18 and 20 with motion. More uniform servo-mechanism loop gain would result in the possibility of operating at a higher average loop gain. This would produce a greater control accuracy.

Hereinafter, there are set forth descriptions of the operations of the control circuit in response to the following departures from normal operating conditions:

Item 1: A decrease in load on the turbine shaft 24, thereby to increase the speed thereof;

Item 2: An increase in load on the turbine shaft 24, thereby to decrease the speed thereof;

Item 3: A sudden drop in load on the turbine shaft 24, thereby to cause a sudden increase in the speed thereof, whereby there is utilized the speed limit removal circuit 680 to cause more rapid movement of the inlet valve 18.

Item 4: An increase in demand for extraction fluid through the conduit 22, thereby to decrease the pressure therein;

Item 5: A decrease in demand for extraction through the conduit 22, thereby to increase the pressure therein;

Item 6: Movement of the extraction valve 20 into either the fully closed position or its fully open position, thereby to increase the gain through the speed control channel.

Referring first to the change in operating condition of item 1 above, in this case a decrease in the load on the turbine shaft 24 causes the speed thereof to increase, thereby to cause the fly-ball governor 58 to pull downwardly on the element 60. Through the operation of the crank 430, the movable magnetic core 431 is inserted further into the differential transformer 432, thereby to increase the coupling and thus the standard signal therefrom. This increase in signal from the transformer 432 of the speed transducer 62 is amplified through the amplifier 441 and demodulated by the demodulator 443. A portion of the demodulated positive signal is fed to the adder network 541 from the speed regulator adjuster 530. A portion of the signal will also be fed over the line 540 into the pressure channel, thereby also to govern the extraction valve 20.

The positive error signal in the speed channel is fed through the adder network 541, the isolating amplifier 543 and the adder network 546. If there has been a change in the extraction pressure in the conduit 22, a portion of that signal will also be impressed at the adder network 546 through the line 550.

The resultant signal from the adder network 546 is divided across the voltage divider by the network 650, and the portion appearing across the resistor 652 is fed via the stabilizing network 655 to the amplifier 653. Assuming that the error signal from the speed channel is not above a predetermined value as set by the control arm 572, to cause operation of the limit removal circuit 580, the signal will be limited in the diode clipper 657. The clipped signal will be fed then through the adder network 659, the stabilizing network 740 and into the D.C. power amplifier 742. The signal from the amplifier 742 will be converted by the servomechanism 76 to drive the inlet valve 18 toward its closed position, thereby to decrease the flow of fluid to the turbine 10.

Movement of the valve 18 toward the closed position will cause the contact 755 to be moved on the resistor 754, thereby to feed a different potential over the line 670 into the adder network 659. The feedback signal on the line 670 will serve to reduce the net error signal fed into the stabilizing network 740, thereby continuously to feed back a signal to decrease the drive for the inlet valve 18 as it reaches the new adjusted position in the direction of its fully closed position.

At the same time, the speed error signal is fed via the line 540 to the pressure control channel and series simultaneously to adjust the position of the extraction valve 20 to compensate for the new position of the inlet valve 18, thereby to keep the pressure in the conduit 22 constant. Preferably, the circuits are arranged such that there will be no pressure error signal derived from the pressure transducer 68 due to movement of the inlet valve 18. Accordingly, the pressure in the conduit 22 will not vary and there will be no "hunting" for a new extraction pressure setting.

Turning now to the change in operating condition of item 2 above, in this case the load on the turbine shaft 24 increases, thereby to reduce the speed of rotation of the shaft 24, the fly-ball governor 58 will move in a direction such as to push the shaft 60 upwardly. The lever 430, accordingly, is pivoted in a clockwise direction, thereby to withdraw the movable magnetic core 431 some distance from the differential transformer 432, so as to decrease the coupling; and as a result, the A.C. signal fed therefrom to the amplifier 441 and the demodulator 443 is small than the standard signal. Therefore, a lower or negative going signal is derived from the the demodulator 443, and is in turn fed to the speed regulator adjuster 530. A predetermined amount of this signal is applied to the contact 532 and fed to the adder network 541, and also applied via the line 540 into the pressure control channel, so as to govern the extraction valve 20.

The signal fed to the adder network 541 is amplified by the amplifier 543 and is combined with a pressure error signal, if any, appearing on the line 550 of the adder network 546. The resultant error signal is then fed to the network 650, and therefrom through the stabilizing network 655, the amplifier 653, the diode clipper 657, and the adder network 659 as the input to the servo-mechanism 76. This signal will be such as to cause movement of the valve 18 toward its open position, thereby to increase the flow of fluid to the turbine 10. As the inlet valve 18 moves, a different signal is picked off by the contact 755 from the resistor 754 and fed back over the line 670 as an input to the adder network 659. As a result, there will then be no error signal output from the adder network 659 when the inlet valve 18 has reached the new adjusted position in the direction of its fully open position.

In the meantime and simultaneously with the operation of the speed channel to change the setting of the inlet valve 18, the speed error signal is fed over the line 540 to the adder network 524 in the pressure control channel, as previously noted. The error signal from the adder network 524 is a combination of the speed error signal and any pressure error signal which has been developed by the transducer 68 and passed through the stages between the transducer 68 and the adder network 524 in the pressure control channel. The output from the adder network 524 is then fed through the succeeding stages in the pressure control channel to the servo-mechanism 78, thereby to move the extraction valve 20 to compensate for the movement of the inlet valve 18, so as to keep the pressure in the conduit 22 constant.

Turning now to the change in operating condition of item 3 above, if there is a sudden drop in load on the turbine shaft 24 of a substantial amount, such as would be occasioned by the removal of all of the load therefrom, this brings into operation the speed limit removal circuit 690. The sudden drop in load is accompanied by a corresponding increase in the speed of the rotation of the turbine shaft 24, which serves to insert the movable magnetic core 431 further into the differential transformer 432, thereby to increase the signal therefrom by a very substantial amount above the standard signal obtained when the turbine shaft 24 is operating at the predetermined speed as established by the position of the contact 562 in the load set circuit 560. This increased or positive going signal is amplified and later demodulated, and the resultant signal fed to the speed regulation adjuster 530. A portion of this signal is fed to the pressure control channel over the line 540, so as to cause a closing movement of the extraction valve 20, thereby to maintain the pressure constant in the extraction conduit 22.

The signal from the contact 532 in the speed regulation adjuster 530 is also fed to the adder network 541 in the speed control channel. The output from the adder network 541 is supplied both to the amplifier 543 in the speed control channel and to the adder network 582 in the speed limit removal circuit 580. The signal from the adder network 582 is supplied to the relay amplifier 585, whereby the output therefrom is fed via the line 586 to effect substantial energization of the relay coil 660, thereby to open the contacts 661 and 662. This serves to eliminate the clipping function of the diode clipper 657 by changing the bias thereon. Accordingly, the positive going error signal indicating a sudden drop in load will be passed through the speed control channel without clipping thereby to effect movement of the inlet valve 18 at an increased rate, substantially above the normal rate of movement thereof, toward its closed position. This more rapid movement of the inlet valve 18 serves to protect the turbine 10 and its auxiliaries against damage thereto that would result from substantial over-speed thereof.

Turning now to the change in operating condition of item 4 above, the situation in which the demand for fluid through the extraction conduit 22 increases. An increase in demand for fluid in the conduit 22 decreases the pressure therein. This results in an increase in the amplitude of the modulated 3.125 kc. signal that is derived from the pressure transducer 68. The signal is balanced in the zeroing circuit 402 and then demodulated in the demodulator amplifier 406. A portion of this signal appearing on the contact 512 in the pressure regulation adjuster 510 is fed to the adder network 517 in the pressure control channel, and also to the resistor 515 in the extraction factor adjuster 514. A portion of the potential applied across the resistor 515 is picked off by the contact 516 and fed via the line 550 to the adder network 546 in the speed control channel. It is noted that the signal fed to the adder network 546 from the speed transducer 62 in the speed control channel is not of a character at this time to effect an opening movement of the inlet valve 18 which is now required. However, the signal applied via the line 550 to the adder network 546 in the speed control channel is in the proper direction to effect an increase in the signal from the output of the adder network 546 that is supplied via the line 547 to the network 650, with the result that the servo-mechanism 76 is controlled, in the manner previously explained, to bring about an opening movement of the inlet valve 18.

The positive going signal fed to the adder network 517 in the pressure control channel is amplified by the amplifier 522 and then combined in the adder network 524 with any signal fed from the speed channel over the line 540. The resultant error signal is supplied via the stabilizing network 525 to the amplifier 602 wherein it is amplified, and then clipped in the diode clipper 604 to insure that the servo-mechanism 78 effects a closing movement of the extraction valve 20 at normal speed, as previously explained. Specifically, the movement of the extraction valve 20 toward its closed position effects an increase in the pressure in the turbine 10 between the stages 14 and 16, with the result that the pressure of the fluid in the conduit 22 is increased, as required.

As the extraction valve 20 is moved toward its closing direction, the contact 725 is moved to adjust the feedback signal that is supplied via the line 613 to the adder network 606. As a result, the extraction valve 20 is moved directly at normal speed to the new desired operating position, thereby to maintain constant the pressure in the extraction conduit 22.

Turning now to the change in operating condition of item 5 above, in this case the demand for fluid through the extraction conduit decreases; and such decrease in demand for fluid in the conduit 22 increases the pressure therein. This results in a decrease in the amplitude of the modulated 3.125 kc. signal that is derived from the pressure transducer 68. The resulting negative going signal therefrom is fed through the pressure control channel to cause an opening movement of the extraction valve 20, thereby to decrease the pressure between the turbine stages 14 and 16, and thus to decrease the pressure in the extraction conduit 22.

Simultaneously, the error signal from the pressure control channel is also fed to the speed control channel via the line 550 to cause closing movement of the inlet valve 18. This will shift a larger portion of the load imposed by the shaft 24 onto the turbine section 16, thereby to keep constant the speed of rotation of the shaft 24, although the required total steam input to the turbine 10 is decreased in view of the decrease in demand for fluid through the extraction conduit 22.

Turning now to the change in operating condition of item 6 above, in one case the demand for extraction of fluid through the extraction conduit 22 becomes so great that the extraction valve 20 is moved into its fully closed position; and in the contrary case, the demand for extraction of fluid through the extraction conduit 22 becomes sufficiently small that the extraction valve 20 is moved into its fully open position. In either of these two cases, the gain of the speed control channel is increased through operation of the speed control gain change circuit 680 to cause an increase in the operating speed of the inlet valve 18, above the normal speed of operation thereof. Referring now to Figure 6, this is accomplished when the signal derived from the pressure transducer 68, when acted upon by the circuits disposed between the pressure transducer 68 and the diode clipper 604, in the pressure channel is such as to provide an input to the differential amplifiers 633 and 634 such that, when combined with the feedback signal on the line 613, there is produced an output from one of the amplifiers 633 or 634 such as to effect operation of the respective one of the relay amplifiers 639 and 636 to cause energization of the respective one of the relay coils 630 and 637 to bring about closure of the respective pair of contacts 631 or 638. In either case, the resistor 651 in the network 650 is shorted out via the conductors of the line 640, with the result that the full error signal from the adder network 546 that is applied via the line 547 to the network 650 is supplied via the stabilizing network 655 to the isolating amplifier 653, thereby to increase the effective gain through the speed control channel. This provides a faster than normal operation of the inlet valve 18. It is to be noted that the error signal from the pressure control channel, thus increased by the above described action, also has an increased effect in the speed control channel.

In view of the foregoing, it will be apparent that there has been provided an electronic control system for an elastic fluid turbine that achieves the foregoing objects and advantages; and in the arrangement, it will be understood that both the required speed of the turbine and the required pressure of the steam in the extraction conduit may be independently preset; and thereafter both a variable load upon the turbine and a variable flow of the steam in the extraction conduit may be readily satisfied, without upsetting either the preset speed of the turbine or the preset pressure of the steam in the extraction conduit, by virtue of the correlated controls that are effected upon the inlet valve and the extraction valve. Moreover, the system satisfies and maintains these operating conditions automatically, making the required adjustments very rapidly so as to anticipate, and thus prevent, undesirable and substantial variations by virtue of the detection of exceedingly small and unsubstantial departures from certain of the preset operating conditions. Furthermore, it will be appreciated that the geenral operating principles disclosed herein are readily applicable to multi-stage extraction elastic fluid turbines, although in the interest of simplicity only a single-stage extraction system has been disclosed.

While certain particular examples of control circuits have been disclosed in the control system for purposes of illustration and description, it is to be understood that various changes can be made therein without departing from the spirit and scope of the invention, whereby it is intended to cover in the appended claims all such modifications as fall within the true spirit and scope of the invention.

What is claimed is:

1. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, and a circuit network controlled by said modified first electric signal for governing the position of one of said valves and controlled by said modified second electric signal for governing the position of the other of said valves, thereby selectively to control both the speed of said output shaft and the fluid pressure in said extraction conduit.

2. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled by said modified first electric signal for selectively moving at a normal rate one of said valves and controlled by said modified second electric signal for selectively moving at a normal rate the other of said valves, and an auxiliary circuit network controlled when one of said valves is in a predetermined position for increasing above normal the rate of movement of the other of said valves under the control of said main circuit network.

3. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled in a normal operation by said modified first electric signal for selectively moving at a normal rate one of said valves and controlled in a normal operation by said modified second electric signal for selectively moving at a normal rate the other of said valves, and an auxiliary circuit network responsive to movement of one of said valves into either its fully open position or its fully closed position for altering the normal operation of said main circuit network so as selectively to move at a higher than normal rate the other of said valves.

4. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled in a normal operation by said modified first electric signal for selectively moving at a normal rate one of said valves and controlled in a normal operation by said modified second electric signal for selectively moving at a normal rate the other of said valves, and an auxiliary circuit network responsive to movement of said extraction valve into either its fully open position or its fully closed position for altering the normal operation of said main circuit network so as selectively to move at a higher than normal rate said inlet valve.

5. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled in a normal operation by said modified first electric signal for selectively moving at a normal rate one of said valves and controlled in a normal operation by said modified second electric signal for selectively moving at a normal rate the other of said valves, and an auxiliary circuit network responsive to a larger than normal and abrupt change in operating conditions of said turbine for altering the normal operation of said main circuit network selectively to move at a higher than normal rate one of said valves.

6. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled in a normal operation by said modified first electric signal for selectively moving at a normal rate one of said valves and controlled in a normal operation by said modified second electric signal for selectively moving at a normal rate the other of said valves, and an auxiliary circuit network responsive to a larger than normal and abrupt change in load on said output shaft for altering the normal operation of said main circuit network so as selectively to move at a higher than normal rate said inlet valve.

7. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled in a normal operation by said modified first electric signal for selectively moving at a normal rate one of said valves and controlled in a normal operation by said modified second electric signal for selectively moving at a normal rate the other of said valves, a first auxiliary circuit network responsive to movement of one of said valves into either its fully open position or its fully closed position for altering the normal operation of said main circuit network so as selectively to move at a higher than normal rate the other of said valves, and a second auxiliary circuit network responsive to a larger than normal and abrupt change in the operating conditions of said turbine for altering the normal operation of said main circuit network so as to move at a higher than normal rate one of said valves.

8. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signals as a function thereof, means controlled by said second electric signal for modifying said first electric signal, means controlled by said first electric signal for modifying said second electric signal, a main circuit network controlled in a normal operation by said modified first electric signal for selectively moving at a normal rate one of said valves and controlled in a normal operation by said modified second electric signal for selectively moving at a normal rate the other of said valves, a first auxiliary circuit network responsive to movement of said extraction valve into either its fully open position or its fully closed position for altering the normal operation of said main circuit network so as selectively to move at a higher than normal rate said inlet valve, and a second auxiliary circuit network responsive to a larger than normal and abrupt change in the speed of said output shaft for altering the normal operation of said main circuit network so as selectively to move at a higher than normal rate said inlet valve.

9. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled by said modified first electric signal for selectively moving one of said valves and controlled by said modified second electric signal for selectively moving the other of said valves, normally able means in said main circuit network limiting to normal rates the movements of said valves, and an auxiliary circuit network responsive to movement of one of said valves into either its fully open position or its fully closed position for disabling said limiting means in said main circuit network so that the movements of the other of said valves are effected at a higher than normal rate.

10. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, a main circuit network controlled by said modified first electric signal for selectively moving one of said valves and controlled by said modified second electric signal for selectively moving the other of said valves, normally able means in said main circuit network limiting to a normal rate the movements of said inlet valve, and an auxiliary circuit network responsive to movement of said extraction valve into either its fully open position or its fully closed position for disabling said limiting means in said main circuit network so that the movements of said inlet valve are effected at a higher than normal rate.

11. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising first mechanism for selectively controlling the movements of said inlet valve, second mechanism for selectively controlling the movements of said extraction valve, means responsive to the speed of said output shaft for generating a first electric signal as a function thereof, means responsive to the pressure in said extraction conduit for generating a second electric signal as a function thereof, means controlled by said second electric signal for modifying said first electric signal, means controlled by said first electric signal for modifying said second electric signal, means controlled by the position of said inlet valve for further modifying said first electric signal, means controlled by the position of said extraction valve for further modifying said second electric signal, and a circuit network controlled by said further modified first electric signal for selectively operating said first mechanism and controlled by said further modified second electric signal for selectively operating said second mechanism.

12. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, first mechanism for controlling the movements of a first of said valves, a first circuit network controlled directly by said first electric signal for selectively operating said first mechanism, means responsive to the fluid pressure in said extraction conduit for generating a second electric signal as a function thereof, second mechanism for controlling the movements of a second of said valves, a second circuit network controlled directly by said second electric signal for selectively operating said second mechanism, and means interconnecting said first and second circuit networks so that said first mechanism is also indirectly controlled by said second electric signal and so that said second mechanism is also indirectly controlled by said first electric signal, whereby the movements of both said inlet valve and said extraction valve are controlled simultaneously.

13. The elastic fluid turbine combination set forth in claim 12, and further comprising means responsive to the character of at least one of said electric signals for selectively controlling the rates of movements of at least one of said valves by the corresponding one of said mechanisms.

14. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, first mechanism for controlling the movements of a first of said valves, a speed control circuit supplied with said first electric signal and connected to control said first mechanism, means responsive to the fluid pressure in said extraction conduit for generating a second electric signal as a function thereof, second mechanism for controlling the movements of a second of said valves, a pressure control circuit supplied with said second electric signal and connected to control said second mechanism, means interconnecting said speed control circuit and said pressure control circuit, whereby said mechanisms are jointly controlled by said first and second electric signals simultaneously to control the positions of both of said valves, means in said speed control circuit for selecting the desired operating speed of said output shaft, and means in said pressure control circuit for selecting the desired fluid pressure in said extraction conduit.

15. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising means responsive to the speed of said output shaft for generating a first electric signal as a function thereof, first mechanism operative to control the movements of a first of said valves, a speed control circuit supplied with said first electric signal and connected to operate said first mechanism, means responsive to the fluid pressure in said extraction conduit for generating a second electric signal as a function thereof, second mechanism operative to control the movements of a second of said valves, a pressure control circuit supplied with said second electric signal and connected to operate said second mechanism, means interconnecting said speed control circuit and said pressure control circuit, whereby both of said mechanisms are jointly operated by said first and second electric signals simultaneously to control the positions of both of said valves, and means for establishing the rates of operation of both of said mechanisms.

16. The elastic fluid turbine combination set forth in claim 15, wherein said establishing means includes facility for adjusting individually the maximum rate of operation of each one of said mechanisms in the closing movement of the associated one of said valves and facility for adjusting individually the maximum rate of operation of each one of said mechanisms in the opening movement of the associated one of said valves.

17. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising an electric generator of a carrier, a speed transducer supplied by said generator and responsive to the speed of said output shaft for modulating said carrier as a function of the speed of said output shaft, a first demodulator supplied by said speed transducer for producing a corresponding electric speed signal therefrom, a pressure transducer supplied by said generator and responsive to the fluid pressure in said extraction conduit for modulating said carrier as a function of the fluid pressure in said extraction conduit, a second demodulator supplied by said pressure transducer for producing a corresponding electric pressure signal therefrom, means controlled by said electric pressure signal for modifying said electric speed signal, means controlled by said electric speed signal for modifying said electric pressure signal, and a circuit network controlled by said modified electric speed signal for governing the position of one of said valves and controlled by said modified electric pressure signal for governing the position of the other of said valves.

18. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising a speed transducer operatively connected to said output shaft for producing a first electric signal in the form of a given carrier modulated as a function of the speed of said output shaft, a first demodulator supplied by said speed transducer to produce a corresponding electric speed signal therefrom, a pressure transducer operatively connected to said extraction conduit for producing a second electric signal in the form of said given carrier modulated as a function of the fluid pressure in said extraction conduit, a second demodulator supplied by said pressure transducer to produce a corresponding electric pressure signal therefrom, a first electric motor for controlling the position of said inlet valve, a second electric motor for controlling the position of said extraction valve, a first amplifying circuit interconnecting the output of said first demodulator and said first motor, a second amplifying circuit interconnecting the output of said second demodulator and said second motor, and means interconnecting said amplifying circuits, whereby the movements of said valves are jointly controlled by said electric speed signal and said electric pressure signal.

19. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising a speed transducer operatively connected to said output shaft for producing a first electric signal in the form of a given carrier modulated as a function of the speed of said output shaft, a first demodulator supplied by said speed transducer to produce a corresponding electric speed signal therefrom, a pressure transducer operatively connected to said extraction conduit for producing a second electric signal in the form of said given carrier modulated as a function of the fluid pressure in said extraction conduit, a second demodulator supplied by said pressure transducer to produce a corresponding electric pressure signal therefrom, a first electric motor for controlling the position of said inlet valve, a second electric motor for controlling the position of said extraction valve, a first amplifying circuit interconnecting the output of said first demodulator and said first motor, a second amplifying circuit interconnecting the output of said second demodulator and said second motor, means interconnecting said amplifying circuits, whereby the movements of said valves are jointly controlled by said electric speed signal and said electric pressure signal, and gain control means responsive to movement of one of said valves into either its fully open position or its fully closed position for increasing the gain of the amplifying circuit associated with the other of said valves.

20. In an elastic fluid multi-stage turbine including a rotatably mounted output shaft, an inlet valve governing the flow of elastic fluid to said turbine, an extraction valve governing the flow of elastic fluid from an intermediate stage to a succeeding stage of said turbine, and an extraction conduit connected to an intermediate stage of said turbine; the combination comprising a speed transducer operatively connected to said output shaft for producing a first electric signal in the form of a given carrier modulated as a function of the speed of said output shaft, a first demodulator supplied by said speed transducer to produce a corresponding electric speed signal therefrom, a pressure transducer operatively connected to said extraction conduit for producing a second electric signal in the form of said given carrier modulated as a function of the fluid pressure in said extraction conduit, a second demodulator supplied by said pressure transducer to produce a corresponding electric pressure signal therefrom, a first electric motor operative to control the position of said inlet valve, a second electric motor operative to control the position of said extraction valve, a first amplifying circuit interconnecting the output of said first demodulator and said first motor, a second amplifying circuit interconnecting the output of said second demodulator and said second motor, means interconnecting said amplifying circuits whereby the movements of said valve are jointly controlled by said electric speed signal and said electric pressure signal, and gain control means responsive to movement of said extraction valve into either its fully open position or its fully closed position for increasing the gain of said first amplifying circuit, thereby to increase the rate of operation of said first motor so as to increase the rate of control of said inlet valve.

21. In an elastic fluid multi-stage turbine including a rotatably mounted output shaft, an extraction conduit connected to said turbine at the junction between primary and secondary sections thereof, a supply conduit connected to the inlet of the primary section of said turbine, a condenser conduit connected to the outlet of the secondary section of said turbine, an inlet valve governing the flow of elastic fluid from said supply conduit into the inlet of the primary section of said turbine, and an extraction valve governing the flow of elastic fluid from said junction into the inlet of the secondary section of said turbine; the combination comprising first mechanism for selectively controlling the position of said inlet valve, second mechanism for selectively controlling the position of said extraction valve, means responsive to the speed of said output shaft for generating a first electric signal as a function thereof, means responsive to the fluid pressure in said junction for generating a second electric signal as a function thereof, means controlled by said second electric signal for modifying said first electric signal, means controlled by said first electric signal for modifying said second electric signal, and a circuit network controlled by said modified first electric signal for selectively actuating one of said mechanisms and controlled by said modified second electric signal for selectively actuating the other of said mechanisms, thereby selectively to control both the speed of said output shaft and the fluid pressure in said extraction conduit.

References Cited in the file of this patent

UNITED STATES PATENTS

| 1,905,760 | Standerwick | Apr. 25, 1933 |
| 2,095,860 | Ericson | Oct. 12, 1937 |
| 2,858,671 | Fox | Nov. 4, 1958 |

FOREIGN PATENTS

| 891,992 | Germany | Oct. 1, 1953 |

UNITED STATES PATENT OFFICE
CERTIFICATION OF CORRECTION

Patent No. 2,977,768                          April 4, 1961

James B. Wagner et al.

It is hereby certified that error appears in the above numbered patent requiring correction and that the said Letters Patent should read as corrected below.

Column 21, line 66, for "signals" read -- signal --; column 26, line 8, for "valve" read -- valves --.

Signed and sealed this 15th day of August 1961.

(SEAL)
Attest:

ERNEST W. SWIDER
Attesting Officer

DAVID L. LADD
Commissioner of Patents